(12) United States Patent
Fahldieck

(10) Patent No.: US 8,738,001 B2
(45) Date of Patent: May 27, 2014

(54) HANDOVER PROCEDURE IN A COORDINATED MULTIPOINT (COMP) TRANSMISSION NETWORK

(75) Inventor: Torsten Fahldieck, Ditzingen (DE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/516,342

(22) PCT Filed: Nov. 26, 2010

(86) PCT No.: PCT/EP2010/068295
§ 371 (c)(1),
(2), (4) Date: Jun. 15, 2012

(87) PCT Pub. No.: WO2011/073011
PCT Pub. Date: Jun. 23, 2011

(65) Prior Publication Data
US 2012/0252462 A1    Oct. 4, 2012

(30) Foreign Application Priority Data
Dec. 17, 2009  (EP) .................................... 09290959

(51) Int. Cl.
*H04W 36/00* (2009.01)
(52) U.S. Cl.
USPC ........................................................ 455/438
(58) Field of Classification Search
USPC ........... 455/436, 561, 438, 456, 456.5, 456.1, 455/552.1; 370/331, 208, 252, 336, 329, 370/328
See application file for complete search history.

(56) References Cited

U.S. PATENT DOCUMENTS 8,498,267 B2 *   7/2013  Choi-Grogan et al. ........ 370/331
2009/0239536 A1 * 9/2009  Fallgren et al. ............... 455/436

FOREIGN PATENT DOCUMENTS

WO    WO 00/28774 A1    5/2000
WO    WO 00/67512 A1    11/2000

OTHER PUBLICATIONS

"LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8)," 3GPP, XP014044751, pp. 1-162, Jul. 1, 2009.
Ericsson, "LTE-Advanced—Coordinated Multipoint transmission/reception," 3GPP, TSG-RAN WG1 #53bis, r1-082469, Warsaw, Poland, XP002574186, pp. 1-6, Jun. 30-Jul. 4, 2008.
Huawei et al., "CoMP clarification of definitions and TP," 3GPP TSG RAN WG1#54 bis, R1-083906, Prague, Czech Republic, XP050317217, pp. 1-6, Sep. 29-Oct. 3, 2008.
International Search Report for PCT/EP2010/068295 dated Feb. 2, 2011.

* cited by examiner

*Primary Examiner* — Kiet Doan
(74) *Attorney, Agent, or Firm* — Fay Sharpe LLP

(57) ABSTRACT

The invention relates to a method for performing a handover procedure in a wireless coordinated multipoint (CoMP) transmission network (200; 700) of a mobile station (100) from a first base station (1) to a second base station (2), wherein the first base station coordinates a first group (202) of base stations, the first base station being a member of the first group, and the second base station coordinates a second group (204) of base stations, the second base station being a member of the second group, and wherein a network component (102) is adapted to transmit data to the first base station and the first group of base stations and/or to the second base station and the second group of base stations.

20 Claims, 4 Drawing Sheets

HANDOVER PROCEDURE IN A COORDINATED MULTIPOINT (COMP) TRANSMISSION NETWORK

FIELD OF THE INVENTION

The invention relates to a method for performing a handover procedure in a wireless coordinated multipoint (CoMP) transmission network.

BACKGROUND AND RELATED ART

In common radio communication systems handover procedures are performed, when a mobile station moves from one cell of the network to another cell of the network. The connection of a mobile station is always controlled by only one base station. The mobile station receives connection data from this base station.

In coordinated multipoint networks multiple base stations send information in a coordinated manner to the mobile station. Common handover mechanisms are not applicable for CoMP networks.

3GPP TS 36.300 version 8.9.0 Release 8 discloses an overview and overall description of the E-UTRAN radio interface protocol architecture. The Intra-E-UTRAN-Access Mobility Support for mobile stations handles all necessary steps for relocation/handover procedures, like processes that precede the final handover decision on the source network side (control and evaluation of mobile station and base station measurements taking into account certain mobile station specific are restrictions), preparation of resources on the target network side, commanding the mobile station to the new radio resource and finally releasing resources on the (old) source network side. It contains mechanisms to transfer context data between evolved nodes, and to update node relations on C-plane and U-plane.

WO 00/67512A1 discloses a method for performing a handover procedure for a mobile station, said method comprising the steps of processing location information related to the mobile stations and position information related to base transceiver station, and deciding on the basis of the result of said processing, whether a first handover condition is fulfilled.

SUMMARY OF THE INVENTION

The invention provides a method for performing a handover procedure in a wireless coordinated multipoint (CoMP) transmission network of a mobile station from a first base station to a second base station. The first base station coordinates a first group of base stations. The first base station is a member of the first group. The second base station coordinates a second group of base stations. The second base station is a member of the second group. A network component is adapted to transmit data to the first base station and the first group of base stations and/or to the second base station and the second group of base stations.

In other words, a data stream meant to be transmitted to the mobile station is transmitted from the network component to the first group of base stations and then forwarded to the mobile station. When a handover of the mobile station from the first base station to the second base station shall be performed the data which shall be transmitted to the mobile station must be directed to the second base station and the second group of base stations instead of the first group in the first group of base stations. The same applies for data being sent from the mobile station to a base station of the first group, the data being meant to be sent to another component in the network, for example another mobile station or a gateway to another network. The data being transmitted from the mobile station to the first group of base stations is first transmitted from the first group of base stations to the network component which then forwards the data to other network means.

Both data streams, the first one from the network component to the mobile station and the second one from the mobile station to the network component, must be redirected in case of a handover procedure. Therefore, the location of the mobile station is estimated. Preferably, the location estimation is based on channel quality information. Most preferably, the first base station has requested channel quality information from the second base station and the first base station has received channel quality information from the second base station. Channel quality information of the channels between the mobile station and each base station of the first group of base stations are transmitted periodically from the mobile station to the first base station or on request of the first base station.

After location estimation a first signal is sent to the second base station, the first signal being indicative of requesting the handover procedure. Preferably, the first signal is transmitted from the first base station to the second base station.

A second signal is sent to the network component, preferably from the second base station. The second signal is indicative of initiating the handover procedure. Then, the data stream from the network component is directed to the second base station and the second group. Then, the connection of the mobile station to the network is controlled by the second base station and every base station of the second group is used for transmitting and receiving data to and from the mobile station according to a coordinated multipoint transmission scheme.

According to embodiments of the invention the location estimation is performed based on channel quality information, the channel quality information being information of connections between the mobile station and the first group and/or information of connections between the mobile station and the second group.

According to embodiments of the invention a fourth signal is sent to the second base station before location estimation. The fourth signal is indicative of requesting a channel quality report. Preferably the fourth signal is transmitted from the first base station to the second base station. A channel quality report always comprises the quality of the channel of the connection between a mobile station and at least one base station. In a coordinated multipoint transmission network one channel quality report always comprises the channel quality of the connection between the mobile station and each base station of one of the first and the second group. Thus, a channel quality report being transmitted from the mobile station to the first base station comprises the channel quality of the connections between the mobile station and each base station of the first group. A channel quality report be ing sent from the mobile station to the second base station comprises the channel quality of the connection of the mobile station to each base station of the second group.

By knowing the channel quality of the connections of the mobile station to each base station of the first and of the second group the location of the mobile station can be estimated. Location estimation is also feasible based only on the channel quality of the connections of one group. Preferably this is the first group. Alternatively it can also be the channel quality of only the second group.

According to embodiments of the invention first channel quality information is transmitted from the mobile station to the first base station and second channel quality information is transmitted from the second base station to the first base station. Preferably, the second channel quality information comprises information about the channel quality of the connection between the mobile station and the second group of base stations.

According to embodiments of the invention the first channel quality information comprises information about a first connection quality between the mobile station and the first base station. The second channel quality information comprises information about a second connection quality between the base station and the second base station.

According to embodiments of the invention the handover procedure is initiated when the second connection quality of the connection between the mobile station and the second base station is above a first threshold.

According to embodiments of the invention the handover procedure is initiated when the first connection quality of the connection between the mobile station and the first base station is below a second threshold.

According to embodiments of the invention the first base station is also a member of the second group and the second base station is also a member of the first group.

According to embodiments of the invention the method comprises a further step of sending a third signal from the network component to the first base station and a fourth signal from the network component to the second base station. The third and the fourth signal are indicative of initiating the handover procedure.

In another aspect the invention relates to a computer readable storage medium containing instructions that when executed by a base station cause the base station to perform a method according to embodiments of the invention.

In yet another aspect the invention relates to a base station apparatus, which comprises means for estimating a location of the mobile station, means for sending a first signal to the second base station, means for sending a second signal to the network component and means for transmitting data to the second base station.

In yet another aspect the invention relates to a telecommunication system comprising a plurality of base stations as described above.

BRIEF DESCRIPTION OF THE DRAWINGS

In the following preferred embodiments of the invention will be described, by way of example only, and with reference to the drawings in which.

DETAILED DESCRIPTION

Like numbered elements in these Figs. are either identical elements or perform the same function. Elements which have been discussed previously will not necessarily be discussed in later Figs. if the function is identical.

Figure 1:
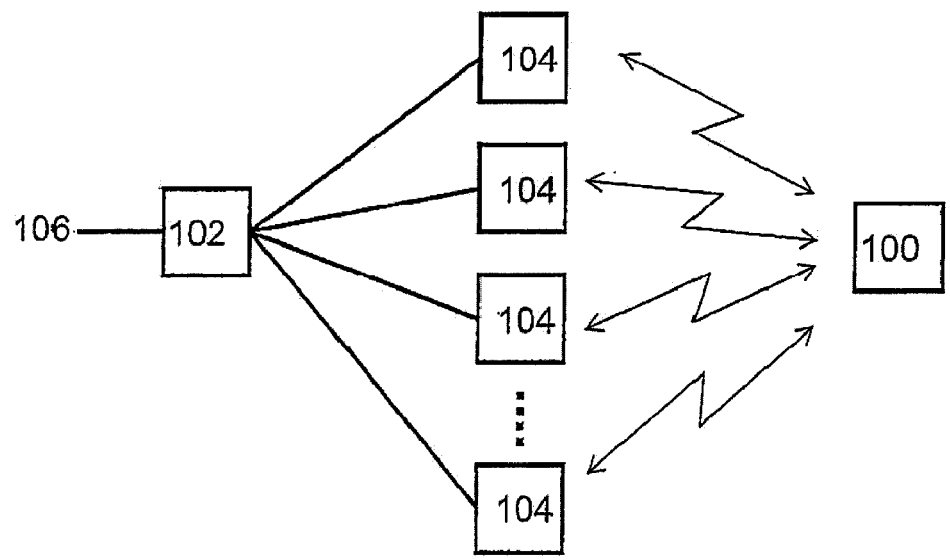
FIG. 1 is a schematic view showing the data stream between a network component and a mobile station.

FIG. 1 is a schematic view showing a plurality of base stations 104, a mobile station 100, a network component 102 and the core network 106.

Data can be transmitted from the mobile station to the plurality of base stations 104 or from the base stations 104 to the mobile station 100 according to a coordinated multipoint transmission scheme. The data being transmitted from the mobile station 100 to the base stations 104 is then forwarded to the network component 102, which then transmits the data to the core network 106. In the other direction, the data being sent to the mobile station 100 from the base stations 104 originates from the network component 102. The network component 102 has received this data from the core network 106.

Figure 2:
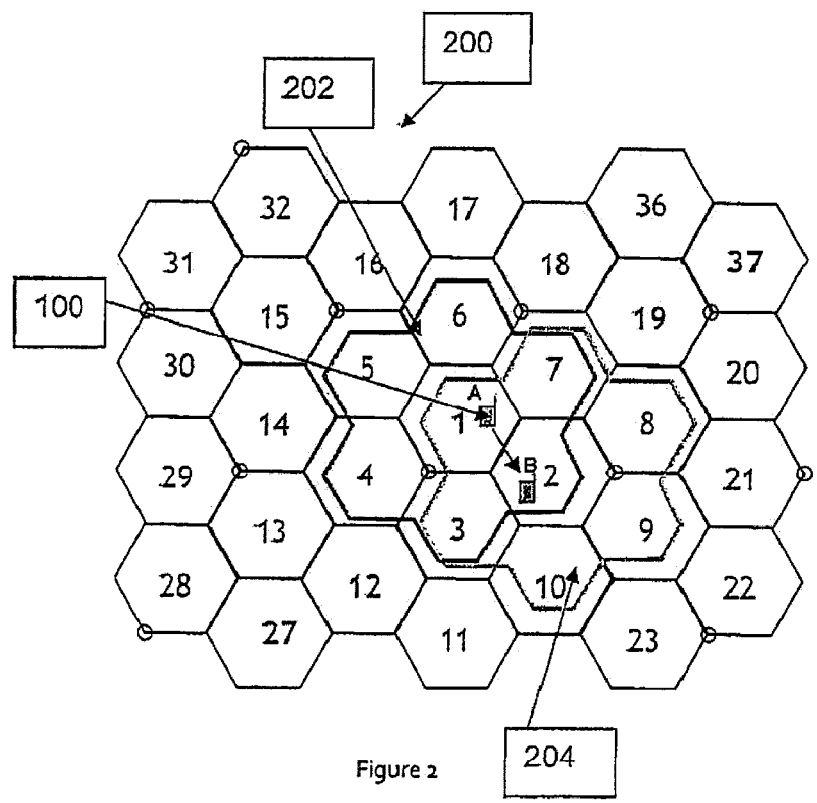
FIG. 2 is a schematic view of a wireless telecommunication network.

FIG. 2 is a schematic view of a wireless telecommunication network 200 comprising a plurality of cells 1-37 and a mobile station 100. Each cell 1-37 is served by a corresponding base station 1-37 (not depicted)

The mobile station 100 is first located at position A in cluster 202. Cluster 202 is a CoMP cluster, which is coordinated by the base station of cell 1. At a second time point the mobile station 100 is located at position B in cell 2. Cell 2 being also in the CoMP cluster 202 and in the CoMP cluster 204, which comprises the cells 1, 2, 3, 7, 8, 9 and 10, the base station of cell 2 coordinating cluster 204. Cluster 202 consists of cells 1, 2, 3, 4, 5, 6, 7, the base station of cell 1 coordinating cluster 202.

A handover is initiated when the mobile station 100 is located at position B because the connection quality of the connection to the base stations of cluster 204 is much better than the connection quality to the base stations of cluster 202, when the mobile station 100 is located at position B.

Figure 3:
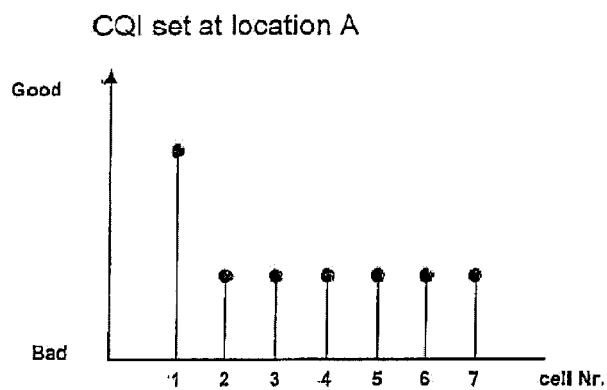
FIG. 3 is a diagram of set of channel quality information.

FIG. 3 is a diagram of the set of channel quality information (CQIS) of the mobile station 100 at location A in FIG. 2. The CQIS is an indicator for the channel quality. CQIS reports are sent periodically from the mobile station to the serving base station. In CoMP networks CQIS reports are transmitted from the mobile base station to the base station coordinating the cluster, to which the mobile station is currently connected.

The CQIS report in FIG. 3 shows the channel state, which corresponds to the channel quality, between the mobile station 100 and the base stations serving cells 1, 2, 3, 4, 5, 6 and 7 in FIG. 2. At location A the channel quality of the connection between the mobile station 100 and the base station of cell 1 is the best channel quality in comparison to the other depicted cells because the mobile station 100 is located in cell 1 with a similar distance to each of the other cells of cluster 202.

Figure 4:
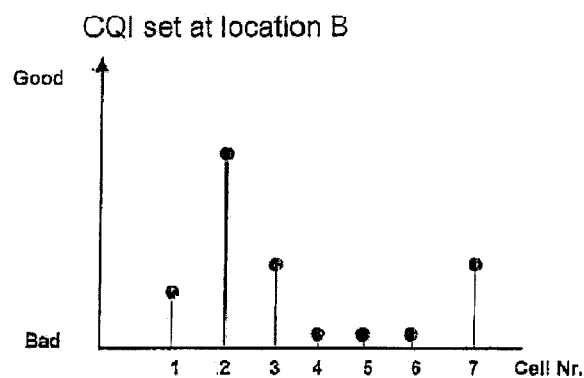
FIG. 4 is a diagram of set of channel quality information.

FIG. 4 shows the CQIS of mobile station 100 at location B in FIG. 2. This CQIS report is reported periodically from the mobile station to the first base station serving cell 1. The channel quality between the mobile station 100 and the base station serving cell 2 is better than the channel quality to any other base station. Especially the channel quality between the mobile station 100 and the base station of cells 4, 5 and 6 is much worse than the channel quality of the connection between the mobile station 100 and base station serving cell number 2. The channel quality of the connection between the mobile station 100 and the base stations of cells 1, 3 and 7 is in between the other channel qualities. The channel quality between the mobile station 100 and base station number 1 is a bit worse than the channel quality between the mobile station 100 and base stations number 3 and 7.

Figure 5:
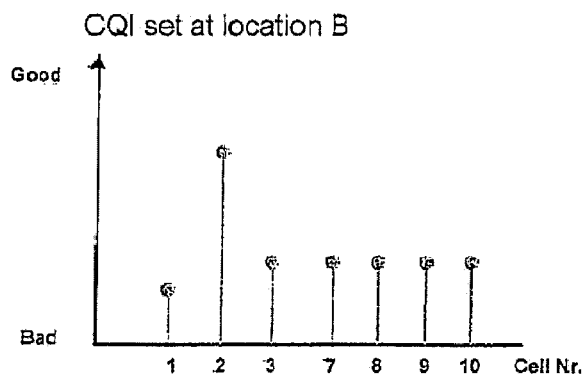
FIG. 5 is a diagram of set of channel quality information.

FIG. 5 shows a CQIS report transmitted from the mobile station to the second base station number 2. The channel state, which corresponds to the channel quality, between the mobile station 100 and the base station serving cell number 2 is best in comparison to the other base stations belonging to cluster 204. Preferably, this CQIS reported is requested by the base station serving cell number 1 after having determined that the channel quality between base station number 2 and mobile station 100 is better than the channel quality between base station number 1 and mobile station 100.

By knowing the diagrams of FIG. 4 and FIG. 5, base station number 1 initiates a handover to base station number 2. This means, the data flow from mobile station 100 to the core network 106 and vice versa has to be directed to the cluster 204 coordinated by base station number 2. The handover procedure can be performed according to common handover procedures.

Figure 6:
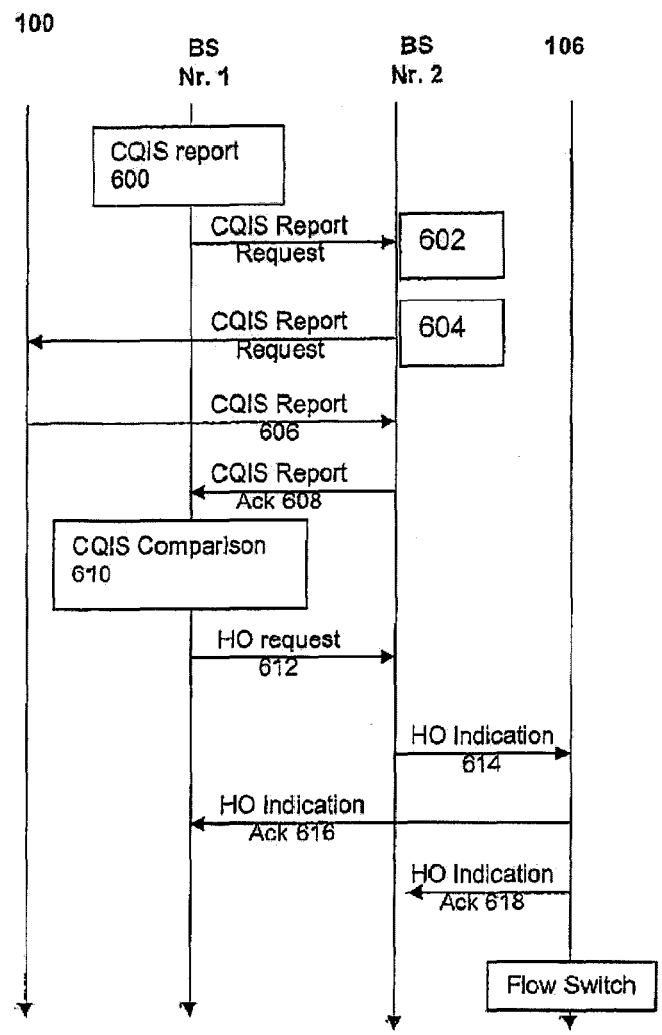
FIG. 6 is messaging diagram.

FIG. 6 shows a detailed view of the messaging between mobile station 100, base station number 1, base station number 2 and the network component 102. First, base station number 1 receives a CQIS report 600 from mobile station 100. CQIS report 600 is reported periodically to base station number 1 from mobile station 100. Then, base station number 1 requests a CQIS report from base station number 2 with a first signal 602. Then, with a second signal 604, base station number 2 requests a CQIS report from mobile station 100. Mobile station 100 sends a second CQIS report 606 to base station number 2. The CQIS report 606 comprises the channel states between the mobile station 100 and each base station of cluster 204, cluster 204 being coordinated by base station number 2. Then, CQIS report 606 is transmitted from base station number 2 to base station number 1 with the CQIS report acknowledgement signal 608.

The two received CQIS reports 600 and 606 are compared in base station number 1 during CQIS comparison 610. This is the location estimation of the mobile station 100. After CQIS comparison 610 the handover procedure is initiated with a handover request message 612 transmitted from base station number 1 to base station number 2. The handover procedure is indicated to network component 106 from base station number 2 by a handover indication signal 614. The handover indication is acknowledged with a signal 616 and 618 transmitted to the base station number 1 and base station number 2. Afterwards the data flow is switched 620. The data flow is switched such that the data is not any longer transmitted from the core network 106 to the first group of base stations but to the second group of base stations. In the other direction data transmitted from the mobile station 100 to the core network 106 is received from the second group of base stations instead of the first group of base stations. The first group of base stations belongs to cluster 202, while the second group of base stations belongs to cluster 204.

Periodically the master basestation 1 of CoMP cluster 202 inspects the CQIS of every mobile station 100 which is administered by this master basestation. The time period is preconfigured. Based on the CQIS of the different basestations 2, 3, 4, 5, 6 and 7, the master basestation 1 computes a performance index from on the CQIS and a coarse location of the mobile station.

Basestation 1, which acts as the master basestation of the blue CoMP cluster 202, inspects the CQIS as shown in FIG. 3. Based in this CQIS the basestation 1 computes a performance index and a location estimation of the mobile station 100. The result of this location estimation (FIG. 3) indicates that the mobile station is probably located in the centre of cell 1, because CQI 1 is significantly better than all other and the CQIs of the surrounding cells and the CQIs 2 to 7 are nearly similar. The performance index and the location estimation point out, that a hand over is currently not necessary.

When the mobile station changes its location from A to B, CQIS values change as shown in FIG. 4. By inspecting these CQIS basestation 1 assumes that the mobile station has changed its location and is now located in the coverage area of basestation 2, because CQIs of basestation 2 is the best channel condition, while Cats of the opposite located basestation 4, 5 and 6 are very low. Basestation 1 initiates now a report request from basestation 2 which is the master of a neighbour cluster 204. Basestation 2 collects CQIS from its cluster, as shown in FIG. 5, and reports this information back to basestation 1 by sending a report acknowledge message (FIG. 6). Basestation 1 generates a performance index and location estimation based on the received CQIS of cluster 204 (FIG. 5). The CQIS of cluster 204 (FIG. 5) gives a significantly better performance index and the location estimation points out that the mobile station is now located in the coverage area of basestation 2, Basestation 1 decides that the mobile station should be serviced from basestation 2 and sends a handover request message to basestation 2.

Basestation 2 sends a handover indication message to the network component 102 which servers both basestations 1 and 2. The backhaul node figures out the data packet number at which a flow switch has to be performed and sends a handover indication message to both basestations 1 and 2 including the packet number. The packet number defines the last packet which has to send out to CoMP cluster 202 which is controlled by basestation 1. Packet number n+1 defines the first packet which has to be sent to CoMP cluster 204 which is controlled by basestation 2.

Figure 7:
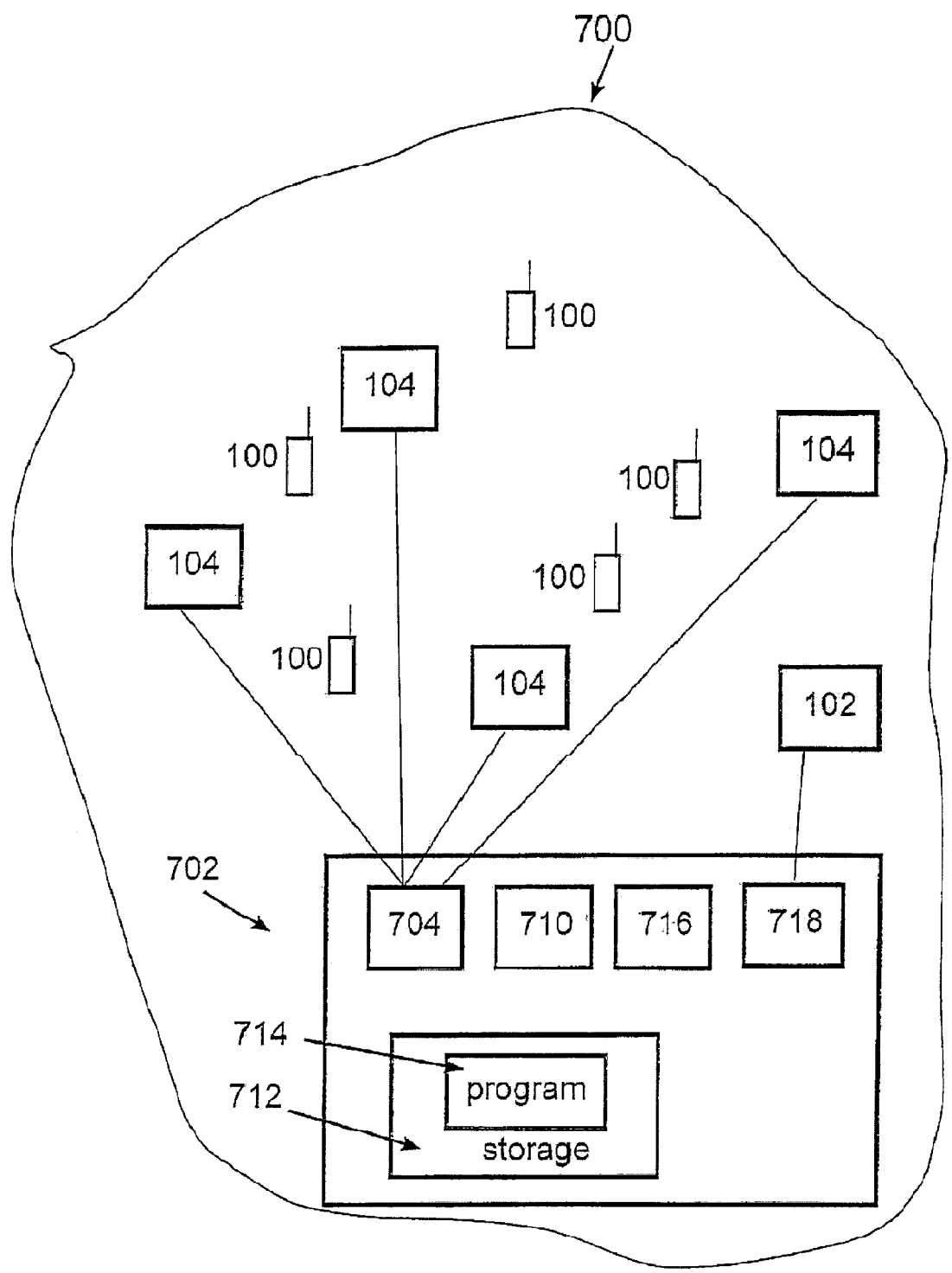
FIG. 7 is a block diagram of a wireless telecommunication network.

FIG. 7 is a block diagram of a wireless telecommunication network 700 comprising a first base station 702, a plurality of base stations 104 and a plurality of mobile stations 100. The base stations 104 form a cluster coordinated by the first base station 702. The mobile stations 100 are connected to this coordinated multipoint cluster. The first base station 702 comprises means 704 for sending and receiving signals to the mobile stations 100. Also data can be transmitted and received via means 704. Means 704 serve as communication means for communications between the first base station 702 and mobile stations 100.

Further, base station 702 comprises means 716 for location estimation of a mobile station 100. With means 718 base station 702 can transmit and receive signals to and from the network component 102.

Preferably a processor 710 executes a program 714 in storage 712, the program causing the processor to perform a method as described above.

List of Reference Numerals 100 mobile station
102 network component
104 base station
106 core network
200 wireless telecommunication network
202 GoMP cluster
204 GoMP cluster
600 GQIS report
602 signal
604 signal
606 CQIS report
608 CQIS report ack
610 CQIS comparison
612 handover request
614 handover indication
616 handover indication ack
618 handover indication ack
620 flow switch
700 wireless telecommunication network
702 base station
704 communication means 710 processor
712 data storage
714 program
716 location estimation means
718 communication means

The invention claimed is:

1. A method for performing a handover procedure, comprising:
    estimating a location of a mobile station at a first base station in a wireless coordinated multipoint (CoMP) transmission network based on a comparison of channel quality information from the mobile station, the channel quality information indicating quality of connections between the mobile station and a first group of base stations and/or quality of connections between the mobile station and a second group of base stations, wherein the first base station coordinates the first group of base stations, the first base station being a member of the first group, wherein the second base station coordinates the second group of base stations, the second base station being a member of the second group, wherein a network component is configured to selectively transmit data to the mobile station via the first base station and the first group of base stations or via the second base station and the second group of base stations, wherein the wireless CoMP transmission network includes the network component, the first group of base stations, and the second group of base stations;
    sending a first signal from the first base station to the second base station based on the comparison of the channel quality information and the estimate of the location of the mobile station indicating conditions exist for a handover of the mobile station from the first group of base stations to the second group of base stations, the first signal being indicative of requesting a handover procedure; and
    sending a second signal from the second base station to the network component to initiate the handover of the mobile station from the first group of base stations to the second group of base stations, the second signal being indicative of initiating the handover procedure;
    wherein, after completion of the handover procedure, data flow between the network component and the mobile station is switched from flowing through the first group of base stations to flowing through the second group of base stations.

2. The method of claim 1, further comprising:
    sending a fourth signal from the first base station to the second base station, the fourth signal requesting a channel quality report for the second group of base stations.

3. The method of claim 1, wherein a first portion of the channel quality information is for the first group of base stations and is received from the mobile station at the first base station, wherein a second portion of the channel quality information is for the second group of base station and is received from the second base station at the first base station.

4. The method of claim 3, wherein the first portion of the channel quality information is indicative of connection quality between the mobile station and the first group of base stations, wherein the second portion of the channel quality information is indicative of connection quality between the mobile station and the second group of base stations.

5. The method of claim 4, wherein the first portion of the channel quality information comprises quality information about connection quality between the mobile station and the second base station, wherein the second portion of the channel quality information comprises quality information about connection quality between the mobile station and the first base station.

6. The method of claim 4, wherein the handover procedure is initiated by sending the signal after the connection quality between the mobile station and the second base station is above a predetermined threshold.

7. The method of claim 4, wherein the handover procedure is initiated by sending the second signal after the connection quality between the mobile station and the first station is below a predetermined threshold.

8. The method of claim 1, wherein the first base station is also a member of the second group of base stations and the second base station is also a member of the first group of base stations.

9. The method of claim 1, further comprising:
    sending a third signal from the network component to the first base station; and
    sending a fourth signal from the network component to the second base station;
    wherein the third and the fourth signals acknowledge the handover procedure was initiated.

10. A non-transitory computer-readable medium storing program instructions that, when executed by a processor, cause the first or second base station to perform one or more element of the method set forth in claim 1.

11. A first base station of a first group of base stations in a wireless coordinated multipoint (CoMP) transmission network, the first base station comprising:
    a coordination processor configured to coordinate the first group of base stations for transmissions between a mobile station served by the first group of base stations and a network component of the wireless CoMP transmission network;
    a location estimating processor configured to estimate a location of the mobile station in the wireless CoMP transmission network based on a comparison of channel quality information from the mobile station, the channel quality information indicating quality of connections between the mobile station and the first group of base stations and/or quality of connections between the mobile station and a second group of base stations in the wireless CoMP transmission network, wherein a second base station coordinates the second group of base stations, the second base station being a member of the second group, wherein the network component is configured to selectively transmit data to the mobile station via the first base station and the first group of base stations or via the second base station and the second group of base stations; and
    a base station communication interface configured to send a first signal to the second base station based on the comparison of the channel quality information and the estimate of the location of the mobile station indicating conditions exist for a handover of the mobile station from the first group of base stations to the second group of base stations, the first signal being indicative of requesting a handover procedure;
    wherein the second base station is configured to send a second signal to the network component to initiate the handover of the mobile station from the first group of base stations to the second group of base stations, the second signal being indicative of initiating the handover procedure;
    wherein, after completion of the handover procedure, data flow between the network component and the mobile station is switched from flowing through the first group of base stations to flowing through the second group of base stations.

12. The first base station of claim 11, wherein the base station communication interface is configured to send a fourth signal to the second base station, the fourth signal requesting a channel quality report for the second group of base stations.

13. The first base station of claim 11, wherein a first portion of the channel quality information is for the first group of base stations and a second portion of the channel quality information is for the second group of base station, the first base station further comprising:
  a mobile station communication interface configured to receive the first portion of the channel quality information from the mobile station;
  wherein the base station communication interface is configured to receive the second portion of the channel quality information from the second base station.

14. The first base station of claim 13, wherein the first portion of the channel quality information is indicative of connection quality between the mobile station and the first group of base stations, wherein the second portion of the channel quality information is indicative of connection quality between the mobile station and the second group of base stations.

15. The first base station of claim 11, wherein the network component is configured to send a third signal to the first base station and to send a fourth signal to the second base station, the third and the fourth signals acknowledging the handover procedure was initiated.

16. A wireless coordinated multipoint (CoMP) transmission network, comprising:
  a first group of base stations, including:
    a first base station configured to estimate a location of a mobile station within the wireless CoMP transmission network based on a comparison of channel quality information from the mobile station, the channel quality information indicating quality of connections between the mobile station and the first group of base stations and/or quality of connections between the mobile station and a second group of base stations, wherein the first base station coordinates the first group of base stations;
  a second group of base stations, including:
    a second base station configured to coordinate the second group of base stations; and
  a network component configured to selectively transmit data to the mobile station via the first base station and the first group of base stations or via the second base station and the second group of base stations;
  wherein the first base station is configured to send a first signal to the second base station based on the comparison of the channel quality information and the estimate of the location of the mobile station indicating conditions exist for a handover of the mobile station from the first group of base stations to the second group of base stations, the first signal being indicative of requesting a handover procedure;
  wherein the second base station is configured to send a second signal to the network component to initiate the handover of the mobile station from the first group of base stations to the second group of base stations, the second signal being indicative of initiating the handover procedure;
  wherein the first group of base stations, second group of base stations, and network component are configured such that, after completion of the handover procedure, data flow between the network component and the mobile station is switched from flowing through the first group of base stations to flowing through the second group of base stations.

17. The wireless CoMP transmission network of claim 16, wherein the first base station is configured to send a fourth signal to the second base station, the fourth signal requesting a channel quality report for the second group of base stations.

18. The wireless CoMP transmission network of claim 16, wherein a first portion of the channel quality information is for the first group of base stations and a second portion of the channel quality information is for the second group of base station;
  wherein the first base station is configured to receive the first portion of the channel quality information from the mobile station and the second portion of the channel quality information from the second base station.

19. The wireless CoMP transmission network of claim 18, wherein the first portion of the channel quality information is indicative of connection quality between the mobile station and the first group of base stations, wherein the second portion of the channel quality information is indicative of connection quality between the mobile station and the second group of base stations.

20. The wireless CoMP transmission network of claim 16, wherein the network component is configured to send a third signal to the first base station and a fourth signal to the second base station;
  wherein the third and the fourth signals acknowledge the handover procedure was initiated.

* * * * *